United States Patent [19]
Minemura et al.

[11] Patent Number: 5,489,482
[45] Date of Patent: Feb. 6, 1996

[54] FILM FORMING COMPOSITION

[75] Inventors: Masahiko Minemura; Osamu Uchida, both of Matsuida, Japan

[73] Assignee: Shin-Etsu Chemical Co., Ltd., Tokyo, Japan

[21] Appl. No.: 339,231

[22] Filed: Nov. 10, 1994

[30] Foreign Application Priority Data

Nov. 10, 1993 [JP] Japan .................................. 5-304860

[51] Int. Cl.⁶ .................................................. B32B 9/04
[52] U.S. Cl. .................... 428/447; 524/268; 524/588; 524/612; 528/38
[58] Field of Search ........................ 524/268, 588, 524/612; 428/447; 528/38

[56] References Cited

U.S. PATENT DOCUMENTS

| | | | |
|---|---|---|---|
| 4,680,366 | 7/1987 | Tanaka et al. | 524/588 |
| 4,810,291 | 3/1989 | Osberghaus et al. | 524/277 |
| 5,025,076 | 6/1991 | Tanaka et al. | 528/38 |
| 5,334,653 | 8/1994 | Kennoki et al. | 528/38 |
| 5,336,715 | 8/1994 | Sejpka et al. | 524/767 |

Primary Examiner—Mark Sweet
Attorney, Agent, or Firm—Oblon, Spivak, McClelland, Maier & Neustadt

[57] ABSTRACT

A film forming composition, comprising an amine-modified highly polymerized polysiloxane represented by the general formula (1):

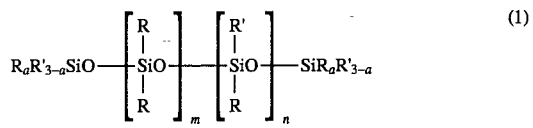

wherein R, which are the same or different, each represent a monovalent hydrocarbon group having 1 to 6 carbon atoms, a hydroxyl group, or a hydrogen atom, R' each represent an amino-group-containing organic group, a is an integer of 0 to 3, m is an integer of 1 or more, and n is an integer of 5 or more, provided that m+n is an integer of 2,000 or more, and dissolved in an organic solvent, which film forming composition can give a smooth soft film that is excellent in water repellency, water resistance, touch, and durability in comparison with the conventional film forming compositions.

11 Claims, No Drawings

FILM FORMING COMPOSITION

BACKGROUND OF THE INVENTION

1. Field of the Invention

The present invention relates to a film forming composition containing a highly polymerized amine-modified polysiloxane that can form a silicone soft film excellent in water repellency and water resistance.

2. Description of the Prior Art

Conventionally, organic silicone resins are used as film forming compositions for rendering the skin or the surface of the hair repellent to water or for protecting a surface (Japanese Pre-examination Patent Publication (KOKAI) Nos. 61-161209, 61-161211, and 61-161214). However, the film made of the organic silicone resin is hard and when the film is applied to the skin, the skin feels stretched or the film chaps and readily comes off, which are drawbacks.

Japanese Patent Publication (KOKOKU) No. 48-1503 suggests as a film forming agent a composition made up of 100 parts by weight of a silicone fluid having a viscosity of 200,000 to 1,000,000 cSt and 1 to 200 parts by weight of an organic silicone resin. However, since this composition has a large content of the silicone fluid, the obtainable film is unsatisfactory in adhesion and is sticky in many cases.

Further, like the above organic silicone resin, a high-polymerization degree dimethylpolysiloxane having a degree of polymerization of 3,000 to 20,000 is used as a film forming material for the skin and the hair. Although the film made of this dimethylpolysiloxane is soft, the adhesion is poor disadvantageously. To make up this deficiency, it is suggested to use the dimethylpolysiloxane in combination with the above organic silicone resin (Japanese Pre-examination Patent Publication (KOKAI) Nos. 63-313713 and 64-43342). The film made of this composition is improved in adhesion to a certain extent, but the stickiness remains.

Further, a siloxane having a degree of polymerization of 1 to 2,000 and a functional group or functional groups for providing it with adhesion to the hair is suggested (Japanese Patent Publication (KOKOKU) No. 3-22844). The film made of this composition is resistant to water to some extent, but it cannot be said that the water resistance is satisfactory.

For the purpose of giving glossiness and smoothness, dimethylsilicone oils are used, for example, for leather, fur, and wood, but they are not satisfactory in the glossiness and smoothness, and retainability thereof.

SUMMARY OF THE INVENTION

Therefore, an object of the present invention is to provide a film forming composition that can give a soft film excellent in water repellency, water resistance, smoothness, and touch and having durability.

The inventors have found that the object can be attained by using an amino-group-modified highly polymerized polysiloxane.

That is, the present invention provides a film forming composition comprising an amine-modified highly polymerized polysiloxane represented by the general formula (1):

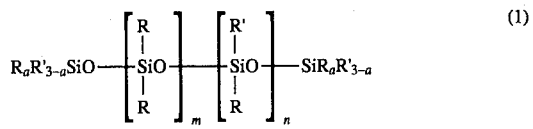

wherein R, which are the same or different, each represent a monovalent hydrocarbon group having 1 to 6 carbon atoms, a hydroxyl group, or a hydrogen atom, R' each represent an amino-group-containing organic group, a is an integer of 0 to 3, m is an integer of 1 or more, and n is an integer of 5 or more, provided that m+n is an integer of 2,000 or more, and an organic solvent in which said amine-modified highly polymerized polysiloxane is dissolved.

According to the present invention, in comparison with the conventional film forming compositions whose major component is a silicone oil, a silicone gel, a highly polymerized dimethylsilicone, or an organic silicone resin, the film forming composition can give a smooth soft film excellent in water repellency, water resistance, touch, and durability.

The invention is now described in detail.

DETAILED DESCRIPTION OF PREFERRED EMBODIMENTS

Amine-modified highly polymerized polysiloxanes

In the general formula (1), examples of the monovalent hydrocarbon group having 1 to 6 carbon atoms represented by R include an alkyl group having 1 to 6 carbon atoms, such as methyl, ethyl, propyl, butyl, pentyl, and hexyl, a cyclohexyl group, and a phenyl group. Among these, preferred are alkyl groups, in particular the methyl group.

The amino-group-containing organic group represented by R' includes, for example, an amino-group-containing organic group represented by the general formula (2):

wherein R" represents a divalent hydrocarbon group having 1 to 10 carbon atoms, and an amino-group-containing organic group represented by the general formula (3):

wherein R'"0 represents a divalent hydrocarbon group having 1 to 10 carbon atoms and R" has the same meaning as defined above.

The divalent hydrocarbon group represented by R" in the above general formula (2) includes, for example, alkylene groups such as ethylene, propylene, butylene, hexylene, and octylene groups, cycloalkylene groups such as cyclohexylene, cyclooctylene, methylcyclohexylene and dimethylcyclohexylene groups, and aromatic hydrocarbon groups such as phenylene, tolylene and xylylene and among them more preferred are alkylene groups such as ethylene, propylene, butylene, hexylene and octylene groups. Most preferred is the propylene group.

Specific examples of the amino-group-containing organic group represented by the above general formula (2) include a γ-aminopropyl group, a β-aminoethyl group, 4-aminocyclohexyl group and p-aminophenyl group, with particular preference given to the γ-aminopropyl group.

The divalent hydrocarbon group represented by R'" in the above general formula (3) includes alkylene groups such as ethylene, propylene, butylene, hexylene, and octylene groups, cycloalkylene groups such as cyclohexylene, cyclooctylene, methylcyclohexylene and dimethylcyclohexylene groups, and aromatic hydrocarbon groups such as phenylene, tolylene and xylylene and among them more preferred are alkylene groups such as ethylene, propylene, butylene, hexylene and octylene groups. Most preferred is the ethylene group.

Specific examples of the amino-group-containing organic group represented by the above general formula (3) include an N-(γ-aminopropyl)-γ-aminopropyl group, an N-(βaminoethyl) -γ-aminopropyl group, N-(β-aminoethyl)-β-aminoethyl group, N-(p-aminophenyl)-β-aminoethyl group and N-(4-aminocyclohexyl)-γ-aminopropyl group, with particular preference given to the N-(β-aminoethyl)-γ-aminopropyl group.

Out of the amino-group-containing groups represented by R' above, most preferred is the γ-aminopropyl group.

In the general formula (1), preferably the content of R' is in such a range that the amine equivalent is 5,000 or more, and preferably 10,000 to 100,000. If the amine equivalent is too low, the heat resistance of the film is lowered. More specifically, m is 1,000 or more, and n is an integer of 5 or more, provided that m+n is an integer of 2,000 or more, and preferably 3,000 to 7,000. If the average degree of polymerization, m+n, is less than 2,000, the adhesion of the obtained film becomes poor and stickiness and glaringness appear.

Organic solvents

Preferably the organic solvent in which the above amine-modified highly polymerized polysiloxane is dissolved includes light liquid isoparaffins or volatile organopolysiloxanes having a boiling point of 95° to 250° C. under normal pressures, which may be used singly or as a mixture of two or more.

The volatile organopolysiloxane includes, for example, a cyclic polysiloxane, such as hexamethylcyclotrisiloxane, octamethylcyclotetrasiloxane, decamethylcyclopentasiloxane, dodecamethylcyclohexasiloxane, trimethyltriethylcyclotrisiloxane, hexaethylcyclotrisiloxane, diethyltetramethylcyclotrisiloxane, dimethyltetraethylcyclotrisiloxane, diethylhexamethylcyclotetrasiloxane, and tetraethyltetramethylcyclotetrasiloxane; a linear polysiloxane, such as hexamethyldisiloxane, octamethyltrisiloxane, decamethyltetrasiloxane, dodecamethylpentasiloxane, hexaethyldisiloxane, and octaethyltrisiloxane, and a branched polysiloxane, such as methyltris(trimethylsiloxy) silane, and phenyltris(trimethylsiloxy) silane. Among these, preferred are octamethylcyclotetrasiloxane and hexamethyldisiloxane.

As the light liquid isoparaffin, commercially available light liquid isoparaffins can be used such as Isopars C, E, G, H, L, and M (trade names, manufactured by Exxon Chemical), IP Solvents 1016, 1620, and 2028 (trade names, manufactured by Idemitsu Petrochemical), MARUKASOL R (trade name, manufactured by Maruzen Petrochemical), Nisseki ISOSOL 300 and 400 (trade names, manufactured by Nippon Petrochemical) and Shell Sol 71 (trade name, manufactured by Shell Chemical).

Out of the above volatile organopolysiloxanes and light liquid isoparaffins, preferred are octamethylcyclotetrasiloxane and light liquid isoparaffins with a boiling point of 50° C. to 250° C.

Preferably the content of the amine-modified highly polymerized polysiloxane in the present composition is 0.1 to 70% by weight, and more preferably 1 to 30% by weight. If the content is too low, a sufficiently uniform film is difficult to be obtained whereas if the content is too high, not only the obtainable film becomes thick but also the organic solvent becomes difficult to evaporate, lowering the drying characteristics.

Usage and uses

To form a film on the surface of a substrate using the present composition, generally, the composition is only applied to the substrate and is dried. However, if necessary, the composition may be heated to about 60 to 150° C. The substrate to which the present composition will be applied includes, for example, the hair, wool, feathers, leather, artificial leather, cotton, threads, artificial fiber, wood, plastics, metals, and powders.

EXAMPLES

The present invention will now be described with reference to the following Examples, which do not limit the scope of the present invention. In the following description, the viscosity was measured at 25° C.

Example 1

0.2 g of dimethylsiloxane whose both ends were blocked with a trimethylsiloxy group, 500 g of octamethylcyclotetrasiloxane, and 0.8 g of γ-aminopropylmethylsiloxane were polymerized in the presence of an alkali catalyst to obtain a γ-aminopropylmethyl-containing highly polymerized polysiloxane having an amine equivalent of 74,000 and a degree of polymerization of 5,000.

This was dissolved in octamethylcyclotetrasiloxane to obtain a transparent liquid containing 10% by weight of it.

Example 2

Example 1 was repeated, except that, in place of 0.8 g of γ-aminopropylmethylsiloxane, 1.0 g of N-(β-aminoethyl) -γ-aminopropylmethylsiloxane was used, thereby obtaining an N-(β-aminoethyl)-γ-aminopropylmethyl-group-containing highly polymerized polysiloxane having an amine equivalent of 35,000 and a degree of polymerization of 5,000.

This was dissolved in a light liquid isoparaffin (Trade name: Nisseki ISOSOL 400, product of Nippon Petrochemical) to obtain a transparent liquid containing 10 % by weight of it.

Example 3

Example 1 was repeated, except that the amount of γ-aminopropylmethylsiloxane was changed to 8.0 g, thereby obtaining a γ-aminopropylmethyl-group-containing highly polymerized polysiloxane having an amine equivalent of 7,400 and a degree of polymerization of 5,000.

This was dissolved in Nisseki ISOSOL 400 mentioned above to obtain a transparent liquid containing 10% by weight of it.

Comparative Example 1

A liquid dimethylpolysiloxane (having a degree of polymerization of 800 and a viscosity of 10,000 cSt) was dispersed in octamethylcyclotetrasiloxane to obtain a transparent liquid containing 10% by weight of it.

Comparative Example 2

A γ-aminopropylmethylpolysiloxane (having a degree of polymerization of 300, a viscosity of 350 cSt, and an amine equivalent of 5,000) was dispersed in octamethylcyclotetrasiloxane to obtain a transparent liquid containing 10% by weight of it.

Comparative Example 3

A highly polymerized dimethylpolysiloxane (having a degree of polymerization of 4,000 and a viscosity of 25,000,000 cp) was dispersed in octamethylcyclotetrasiloxane to obtain a transparent liquid containing 10% by weight of it.

1 g of the transparent liquid obtained in each of the above Examples was applied uniformly to bovine leather (4 cm×10 cm), and after it was dried by allowing it to stand for 1 day, the horizontal resistance value was measured by using a DF.PM meter (manufactured by Kyowa Chemical) under such conditions that the vertical load was 50 g and the speed of movement of the pen tip was 19 cm/min to evaluate the smoothness. The horizontal resistance value was also measured after washing the bovine leather for 60 min with water and drying it. The results are shown in Table 1 together with the horizontal resistance value of the untreated bovine leather.

TABLE 1

| | (horizontal resistance values, in grams) | | |
|---|---|---|---|
| | Before application | After application and drying | After washing with water and drying |
| Blank | 27.0 | — | 25.9 |
| Example 1 | 27.2 | 14.2 | 14.5 |
| Example 2 | 26.3 | 14.2 | 14.6 |
| Example 3 | 27.9 | 14.1 | 14.9 |
| Comparative Example 1 | 28.1 | 24.6 | 22.8 |
| Comparative Example 2 | 27.3 | 14.6 | 17.7 |
| Comparative Example 3 | 27.7 | 19.5 | 21.8 |

Further, after each of the transparent liquids obtained in the Examples was applied to the hair of three monitors (A, B, and C) and was dried and the hair was washed with water and dried, the smoothness and stickiness of the hair were measured and evaluated on the base of the criterion shown in Table 2. The results are shown in Table 3.

TABLE 2

| | Smoothness | Stickiness |
|---|---|---|
| ⊙ | Quite smooth | Not sticky at all |
| ○ | A little smooth | Almost not sticky |
| Δ | A little coarse | A little sticky |
| X | Quite coarse | Quite sticky |

TABLE 3

| | After application and drying | | | | | | After washing with water and drying | | | | | |
|---|---|---|---|---|---|---|---|---|---|---|---|---|
| | Smoothness | | | Stickiness | | | Smoothness | | | Stickiness | | |
| | A | B | C | A | B | C | A | B | C | A | B | C |
| Example 1 | ⊙ | ⊙ | ○ | ⊙ | ⊙ | ⊙ | ○ | ○ | ○ | ⊙ | ⊙ | ○ |
| Example 2 | ○ | ⊙ | ○ | ⊙ | ⊙ | ⊙ | ○ | ⊙ | ○ | ○ | ⊙ | ○ |
| Example 3 | ○ | ⊙ | ○ | ⊙ | ⊙ | ○ | ○ | ○ | ○ | ⊙ | ○ | ○ |
| Comparative Example 1 | Δ | X | Δ | X | X | X | X | X | X | X | X | X |
| Comparative Example 2 | ⊙ | ⊙ | ○ | Δ | Δ | X | ○ | ○ | ○ | ○ | Δ | Δ |
| Comparative Example 3 | ⊙ | ○ | ○ | ⊙ | ⊙ | ⊙ | Δ | Δ | Δ | X | X | Δ |

As is apparent from the results shown in Tables 1 and 3, it can be understood that the present amine-modified highly polymerized polysiloxane can form a silicone film that is excellent in water repellency and water resistance and is good in touch for a long period of time.

What is claimed is:

1. A film forming composition, comprising an amine-modified highly polymerized polysiloxane represented by the general formula (1):ps

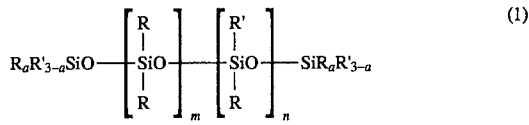

wherein R, which are the same or different, each represent a monovalent hydrocarbon group having 1 to 6 carbon atoms, a hydroxyl group, or a hydrogen atom, R' each represent an amino-group-containing organic group, a is an integer of 0 to 3, m is an integer of 1 or more, and n is an integer of 5 or more, provided that m+n is an integer of 2,000 or more, and an organic solvent in which said amine-modified highly polymerized polysiloxane is dissolved.

2. The film forming composition of claim 1, wherein the hydrocarbon group having 1 to 6 carbon atoms represented by R above is the methyl group.

3. The film forming composition of claim 1, wherein the amino-group-containing organic group represented by R' above is an amino-group-containing organic group represented by the general formula (2):

wherein R" represents a divalent hydrocarbon group having 1 to 10 carbon atoms.

4. The film forming composition of claim 1, wherein the amino-group-containing organic group represented by R' is an amino-group-containing organic group represented by the general formula (3):

wherein R" and R'" each independently represents a divalent hydrocarbon group having 1 to 10 carbon atoms.

5. The film forming composition of claim 4, wherein the amino-group-containing organic group represented by the above general formula (3) is the N-(β-aminoethyl)-γ-aminopropyl group.

6. The film forming composition of claim 1, wherein the amino-group-containing organic group represented by R' above is the γ-aminopropyl group.

7. The film forming composition of claim 1, wherein said organic solvent is a volatile organopolysiloxane or a light liquid isoparaffin.

8. The film forming composition of claim 7, wherein said volatile organopolysiloxane is octamethylcyclotetrasiloxane.

9. The film forming composition of claim 1, wherein the content of said amine-modified highly polymerized polysiloxane is 0.1 to 70% by weight.

10. The film forming composition of claim 1, wherein the content of said amine-modified highly polymerized polysiloxane is 1 to 30% by weight.

11. A film obtained by applying the composition of claim 1 to a substrate and drying said composition.

* * * * *